BALANCED LINE DRIVER
Filed Oct. 1, 1964
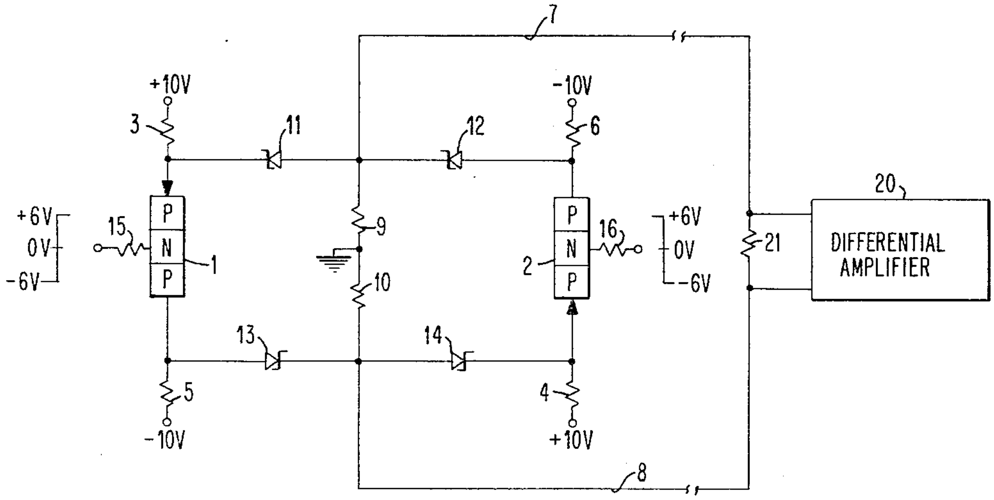
INVENTORS
CARTER E. DORRELL
GEORGE J. LAURER
BY John C Black
ATTORNEY United States Patent Office 3,381,090
Patented Apr. 30, 1968

3,381,090
BALANCED LINE DRIVER

Carter E. Dorrell, Owego, and George J. Laurer, Endwell, N.Y., assignors to International Business Machines Corporation, New York, N.Y., a corporation of New York Filed Oct. 1, 1964, Ser. No. 400,768
5 Claims. (Cl. 178—70)

This invention is directed to an improved transmission apparatus including an improved balanced line driver with a clearly defined signal amplitude and high noise rejection.

The improved driver has been particularly adapted for transmitting digital data over long lines terminating in a differential sense amplifier, for example that shown in U.S. patent application of R. L. Delanoy, D. F. Foreman, and G. J. Laurer, Ser. No. 400,828, filed Oct. 1, 1964, and entitled, Data Transmission Apparatus.

It is a primary object of the present invention to provide an improved long line driver without recourse to a transformer or other alternating current coupling.

This object is achieved in a preferred embodiment of the invention by providing a pair of transistors which are alterantively cut off or in saturation and with Zener diodes connected between each collector and emitter and the output line. When one of the transistors is operated in saturation while the other is cut off, all Zener diodes are conducting in their reverse breakdown directions to establish a positive voltage on one line conductor and a negative voltage on the other line conductor, the voltages having a value equal to the drop across the Zener diode. When the other transistor is operated in saturation and the one transistor is cut off, the polarities of the voltages at the two line conductors are reversed. The sets of polarities applied to the line conductors may be arbitrarily assigned logic "1" and logic "0" designations.

The improved driver is capable of performing an exclusive OR function, and it is therefore another object to provide a novel exclusive OR logic block.

The foregoing and other objects, features and advantages of the invention will be apparent from the following more particular description of a preferred embodiment of the invention, as illustrated in the accompanying drawing.

The improved balanced driver includes a pair of transistors 1 and 2 of the same conductivity type. The emitter electrodes of the transistors 1 and 2 are connected to a source of positive potential by way of resistor 3 and 4, respectively. The collector electrodes of the transstors 1 and 2 are connected to negative potential sources by way of resistors 5 and 6.

An output transmission line including conductors 7 and 8 is connected to ground potential by resistors 9 and 10, respectively. The line conductor 7 is connected to the emitter electrode of the transistor 1 by way of a Zener diode 11 and to the collector electrode of the transistor 2 by way of a Zener diode 12. The line conductor 8 is connected to the collector electrode of the transistor 1 by a Zener diode 13 and to the emitter electrode of the transistor 2 by a Zener diode 14.

A terminator circuit 20 is connected to the remote ends of the conductors 7 and 8. The terminator is preferably a differential amplifier which responds to reversals in polarity of the current in the conductors 7 and 8. The transmission line is terminated in its characteristic impedance 21.

In the preferred embodiment the resistors 3, 4, 5, 6, 9 and 10 are all equal in value to provide a balanced circuit. The reverse breakdown characteristics of each of the Zener diodes 11, 12, 13 and 14 are selected to be identical.

Input signals are applied to the base electrodes of the transistors 1 and 2 by way of resistors 15 and 16, each of which has a resistance value substantially larger than the values of the resistors 3 to 6, for example, in the order of 10 times as great.

The signals which are applied to the resistors 15 and 16 are such as to cause one of the transistors to be cut off and the other to be operated in saturation. A typical source for such signals is a bistable trigger having complemented outputs.

Assuming that the transistor 1 is cut off and the transistor 2 is in saturation, the emitter and collector electrodes of the transistor 2 will be at substantially ground potential by reason of the balanced circuit. The Zener diodes 11, 12, 13 and 14 will be conducting in their reverse breakdown direction, thereby to establish at the conductors 7 and 8 positive and negative potentials, respectively equal to the potential drops across the Zener diodes 12 and 14.

When the transistor 2 is cut off and the transistor 1 is operated at saturation, negative and positive potentials, respectively will exist at the conductors 7 and 8 equal in value to the voltage drop across the Zener diodes 11 and 13.

Since the voltage drops across each of the conducting Zener diodes are equal, the absolute values of the voltages impressed upon the conductors 7 and 8 will be equal, but of opposite polarity, and a reversal in the polarities will characterize the change in the logical statement, i.e., from logic "1" to "0" or from logic "0" to logic "1." In one embodiment, utilizing the voltage supply levels illustrated in the drawing and Zener diodes with reverse breakdowns of 3 volts, the following component values were utilized to achieve the desired operation. It will be appreciated that these values are given only by way of example, and that the invention is not to be limited thereto:

| | Ohms |
|---|---|
| Resistors 3, 4, 5, 6, 9 and 10 | 1,100 |
| Resistors 15 and 16 | 12,000 |

In many applications depending upon the length of the transmission line to be driven and the stray line capacitances, it will be desirable to utilize Zener diodes with lower reverse breakdown voltages or conventional diodes selected to have equal forward breakdown voltages.

Transistors of opposite conductivity types may be used, in which case one line conductor will be connected through diodes to the emitters of the transistors and the other line conductor to the collectors.

It can be seen that ground potential exists on conductors 7 and 8 in the event that both transistors 1 and 2 are simultaneously in saturation or simultaneously at cutoff. Thus the circuit can perform an exclusive OR function, the existance of a potential difference across the lines 7 and 8 representing satisfaction of the exclusive OR function.

While the invention has been particularly shown and described with reference to a preferred embodiment thereof, it will be understood by those skilled in the art that various changes in form and details may be made therein without departing from the spirit and scope of the invention.

What is claimed is:

1. Direct current coupled transmission apparatus comprising:
a balanced line driver including
a source of operating potential,
a pair of transistors of the same conductivity type, each having base, emitter and collector,
a source of bivalued complementary input signals,
impedance means coupling the source of input signals to the base electrodes of the transistors to cause alternative operation of the transistors at cutoff and in saturation, substantially equal impedances coupling each collector and each emitter to the source of potential, a first pair of similarly poled Zener diodes connected in series between the collector of one transistor and the emitter of the other transistor and energized in their reverse breakdown mode by the source of operating potential, and a second pair of similarly poled Zener diodes connected in series between the other collector and emitter and energized in their reverse breakdown mode by the source of operating potential;

a transmission line having a pair of input terminals connected to respective junctions between each diode pair and having output terminals; and a differential amplifier connected to the output terminals and controlled by the polarity of the current flow in the transmission line.

2. Direct current coupled transmission apparatus comprising:

a balanced line driver including a source of operating potential, a pair of transistors of the same conductivity type, each having a base, emitter and collector, a source of input signals, impedance means coupling the source of input signals to the base electrodes of the transistors to cause operation of one of the transistors at cutoff and the other in saturation in response to one combination of input signals and operation of the other transistor at cutoff and the one in saturation in response to another combination of input signals, substantially equal impedances coupling each collector and each emitter to the source of potential, a first pair of similarly poled diodes connected in series between the collector of one transistor and the emitter of the other transistor and energized by the source of operating potential to produce equal voltage drops across each diode, and a second pair of similarly poled diodes connected in series between the other collector and emitter and energized by the source of operating potential to produce equal voltage drops across each diode;

a transmission line having a pair of input terminals connected to respective junctions between each diode pair and having output terminals; and a differential amplifier connected to the output terminals and controlled by the polarity of the current flow in the transmission line.

3. A balanced line driver comprising:

a source of operating potential;

a pair of transistors of the same conductivity type, each having a base, emitter and collector;

a source of bivalued complementary input signals;

impedance means coupling the source of input signals to the base electrodes of the transistors to cause alternative operation of the transistors at cutoff and in saturation;

substantially equal impedances coupling each collector and each emitter to the source of potential;

a pair of transmission line conductors;

a first pair of similarly poled diodes connected in series between the collector of one transistor and the emitter of the other transistor and energized by the source of operating potential to produce equal voltage drops across each diode; and a second pair of similarly poled diodes connected in series between the other collector and emitter and energized by the source of operating potential to produce equal voltage drops across each diode;

the junction between each diode pair being connected to a respective one of the conductors.

4. A balanced line driver comprising a source of operating potential;

a pair of transistors, each including emitter and collector electrodes;

means operating the transistors so that one of the transistors is cut off and the other is saturated and alternatively the other is cut off and the one is saturated;

substantially equal impedances coupling each electrode to the source of potential;

a pair of transmission line conductors;

a first pair of similarly poled diodes connected in series between an electrode of one transistor and an electrode of the other transistor and energized by the source of operating potential to produce substantially equal drops thereacross; and a second pair of similarly poled diodes connected in series between the other electrodes and energized by the source of operating potential to produce substantially equal voltage drops thereacross;

the junction between each diode pair being connected to a respective one of the conductors.

5. A balanced line driver comprising a source of operating potential;

a pair of transistors of the same conductivity type, each having a base, emitter and collector;

a source of bivalued complementary input signals;

impedance means coupling the source of input signals to the base electrodes of the transistors to cause alternative operation of the transistors at cutoff and in saturation;

substantially equal impedances coupling each collector and each emitter to the source of potential;

a pair of transmission line conductors;

a first pair of similarly poled Zener diodes connected in series between the collector of one transistor and the emitter of the other transistor and energized in their reverse breakdown mode by the source of operating potential; and a second pair of similarly poled Zener diodes connected in series between the other collector and emitter and energized in their reverse breakdown mode by the source of operating potential;

the junction between each diode pair being connected to a respective one of the conductors.

No references cited.

THOMAS A. ROBINSON, *Primary Examiner.*